[11] 3,718,488
[45] Feb. 27, 1973

United States Patent
Trofimenko et al.

[54] PRECIOUS METAL DECORATING COMPOSITIONS CONTAINING BIS-CHELATE DERIVATIVES OF PALLADIUM

[75] Inventors: Swiatoslaw Trofimenko, Newark; Lawrence G. Vaughan, Wilmington, both of Del.

[73] Assignee: E. I. du Pont de Nemours and Company, Wilmington, Del.

[22] Filed: March 2, 1971

[21] Appl. No.: 120,303

Related U.S. Application Data

[63] Continuation-in-part of Ser. No. 792,847, Jan. 21, 1969.

[52] U.S. Cl. ............106/1, 117/123 B, 117/124 C, 117/227, 252/514
[51] Int. Cl. .............................................C23c 3/04
[58] Field of Search...106/1; 252/514; 117/227, 123 B, 117/123 C, 124 B, 124 C, 124 D; 260/429 J

[56] References Cited

UNITED STATES PATENTS

| | | | |
|---|---|---|---|
| 3,216,834 | 11/1965 | Fitch | 106/1 |
| 3,428,476 | 2/1969 | Langley et al. | 117/123 B X |

*Primary Examiner*—Lorenzo B. Hayes
*Attorney*—James A. Forstner

[57] ABSTRACT

Precious metal decorating compositions containing bis-chelate derivatives of palladium are useful in forming decorative films having high thermal stability. These precious metal decorating compositions are suitable for application to various substrates including glass, quartz, alumina, and other ceramic materials.

10 Claims, No Drawings

PRECIOUS METAL DECORATING COMPOSITIONS CONTAINING BIS-CHELATE DERIVATIVES OF PALLADIUM

CROSS-REFERENCE TO RELATED APPLICATION

This application is a continuation-in-part of our copending application Ser. No. 792,847, filed Jan. 21, 1969.

BACKGROUND OF THE INVENTION

Decorating compositions containing palladium for use on glass and ceramics are known in the art. Such compositions contain a palladium resinate prepared by causing a palladium salt to react with a sulfurized terpene such as sulfurized Venetian turpentine. The palladium resinate is dissolved in vehicles such as oils of lavender, rosemary, aniseed, sassafras, wintergreen and fennel, turpentine, various terpenes, nitrobenzene and the like. The dissolved resinate is mixed with fluxes such as salts and resinates of rhodium, chromium, bismuth, lead, cadmium, tin, copper, cobalt, antimony and with resins such as Assyrian asphalt and various rosins to form decorating compositions. Such compositions are known as liquid bright palladiums. Other liquid bright palladiums containing bis-thioether palladous salt coordination compounds are described in U.S. Pat. No. 3,216,834.

Precious metal decorating compositions are applied by brushing, stamping, spraying, screen printing, offset printing or other techniques to refractory substrates such as glass and ceramics. Upon firing the coated refractory substrates at a temperature within the range of 500°–800°C., adherent precious metal films result. These films are useful for their decorative appeal, for their ability to conduct electricity, to transmit particular wave lengths of ultraviolet light and visible light, to reflect infra-red and other energy, as basis for soldering and for other purposes.

To be useful in the preparation of palladium films or coatings on various surfaces, a palladium compound should (1) have a relatively palladium content, (2) be stable at room temperature and preferably also up to at least about 100°C., (3) be readily soluble in common organic solvent systems of commerce, and (4) decompose readily under firing conditions to give metallic palladium. Palladium compounds used heretofore for coating ceramic surfaces have not met one or more of these requirements.

It is the purpose of this invention to implement the field of precious metal decorating compositions and to provide decorating compositions which overcome the prior deficiencies.

SUMMARY OF THE INVENTION

This invention relates to precious metal decorating compositions comprising a palladium compound represented by the following formulas:

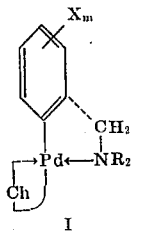
I

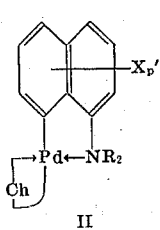
II

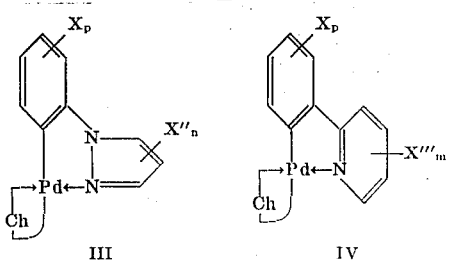
III            IV

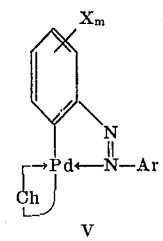
V wherein:
Pd represents palladium in the +2 oxidation state, i.e., palladium with a formal valence of two, i.e., palladium(II);
R is lower alkyl, the two R groups attached to any one nitrogen atom being the same or different and preferably the same, and at least one R group being bonded to nitrogen through a carbon bonded to at least two hydrogens, i.e., a primary alkyl group;
Ar is aryl having up to 12 carbon atoms;
X is lower alkyl, lower alkoxy, F, Cl, or Br;
$m$ is 0, 1, or 2;
X' is Cl or Br;
$p$ is 0 or 1;
X'' is Cl, Br, lower alkyl, or phenyl;
$n$ is 0, 1, 2, or 3;
X''' is lower alkyl, lower alkoxy, or phenyl; and
Ch is a bidentate chelate ligand formed by removal of a hydrogen from a beta-diketone, a beta-keto aldehyde, a beta-keto ester, a mono or bis(hydrocarbylimino) derivative of a beta-diketone, beta-keto aldehyde, or beta-keto ester, a tropolone, an aminotroponeimine and a salicylaldimine. Ch has up to 12 carbon atoms; "lower alkyl" are aliphatic groups having up to eight carbon atoms; "lower alkoxy" groups are represented by —OR, where R are such lower alkyl groups of up to eight carbon atoms.

DESCRIPTION OF THE PREFERRED EMBODIMENTS

The novel precious metal decorating compositions of this invention attribute their uniqueness to the use of bischelate derivatives of palladium. These palladium compounds and their method of preparation are described in detail in commonly assigned copending U.S. Pat. application Ser. No. 792,841, filed Jan. 21, 1969; said copending application is hereby incorporated by reference into this specification. The preparation of a compound represented by V is, for example, described in Heck, *J. Am. Chem. Soc.* 90, , 313 at 316 (1968), i.e., acetylacetonato-2-(phenylazo)phenyl palladium.

PREPARATION AND DESCRIPTION OF PALLADIUM COMPOUNDS

The products of formulas I-IV are made by reacting a dimeric arylpalladium(II) halide (usually a chloride or bromide) in which the aryl group is an aryl-amino group as represented in formulas I-IV, with a compound Ch-H, in which Ch is as defined above and which is a compound capable of forming a monovalent, bidentate chelate linkage with a metal. An example of such an arylpalladium(II) halide dimer is dimeric 2-(dimethylaminomethyl)phenylpalladium(II) chloride,

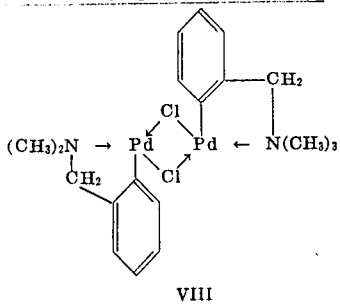

VIII in which the organic moieties correspond to the aryl-amino portion of formula I.

The preparation of metal chelates, in which one or more Ch groups as defined above are bonded to a metal, from metal halides and the parent Ch-H, is well known to those skilled in the art. Various embodiments of the process are reviewed, for example, in "Inorganic Syntheses", Vol. II, Ed. Fernelius, pp. 10-20 ff. (McGraw-Hill, 1946) and Vol. XI, Ed. Jolly, pp. 72–82 ff. (1968). Preparations of individual metal chelates are scattered throughout the chemical literature, and references to some of these publications are given in "Inorganic Syntheses".

The palladium(II) chelates of the present invention can be prepared, for example, by reaction of a halide of the type illustrated by formula VIII with (a) a compound Ch-H in the presence of a base or (b) a preformed metal salt of a compound Ch-H, in which the H is replaced by one equivalent of a metal. The base can be, for example, a hydroxide, oxide, or carbonate of an alkali metal or it can be ammonia, a primary, secondary, or tertiary alkylamine, or a quaternary ammonium hydroxide. Both these methods are mentioned in "Inorganic Syntheses". If a preformed salt is used, it is usually an alkali-metal salt or a thallium salt.

In preparing the products of this invention, it is convenient to use a solvent such as dimethylformamide or a di(lower alkyl)amide of a lower alkanecarboxylic acid. Alternatively, a lower alkanenitrile such as acetonitrile or propionitrile, a lower alkanone such as acetone or methyl ethyl ketone, or other solvents such as dimethyl sulfoxide or methylene chloride can be used. The products are soluble in such solvents, and thus the initial reaction mixture need not be homogeneous. The preferred temperature is in the range 30°–80 °C. Higher temperatures should be used with caution, since reduction of the palladium to palladium metal may take place. Temperatures as low as about −20°C. can be used, but no advantage results, and the reaction may be unnecessarily slow. The palladium(II) chelates are all insoluble in water and can be readily isolated as solids by diluting the reaction mixtures with excess water. They can then be separated by filtration or extracted with a water-immiscible liquid such as methylene chloride. They can be purified by conventional procedures such as chromatography or recrystallization from common solvents.

The new palladium(II) chelates of this invention are colorless or pale-yellow crystalline solids that are thermally stable to well over 100°C. They dissolve readily in many commercial organic solvents, e.g., aromatic hydrocarbons and chlorinated aliphatic and aromatic hydrocarbons. They are also somewhat soluble in aliphatic hydrocarbons. They are stable indefinitely to ordinary atmospheric conditions and in storage.

The arylpalladium(II) halide dimers used as reactants to prepare products of the invention were obtained as follows.

EXAMPLE A 2-(3,5-Dimethyl-1-pyrazolyl)phenylpalladium(II) Chloride Dimer

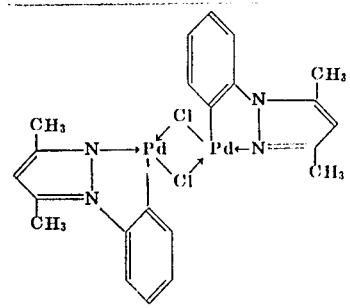

3,5-Dimethyl-1-phenylpyrazole (1.9 g.) was added with stirring to a mixture of 3.26 g. of $K_2PdCl_4$, 200 ml. of water, and 50 ml. of methanol. The mixture was stirred at 68°C. for 4 hours and then at room temperature overnight. The pale orange-gray solid that had precipitated was separated by filtration, washed with water, washed with methanol and dried. The yield was 3.2 g.

EXAMPLE B 2-(1-Pyrazolyl)phenylpalladium(II) Chloride Dimer

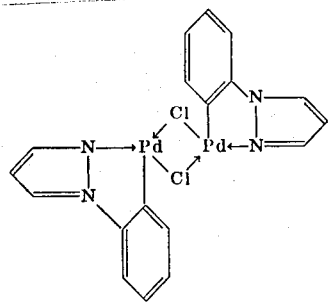

A solution of $Na_2PdCl_4$ was prepared by stirring overnight at room temperature a mixture of 17.7 g. of $PdCl_2$, 12 g. of NaCl, 500 ml. of methanol and 25 ml. of water. The resulting reddish-brown solution was 0.19 M in $Na_2PdCl_4$.

A mixture of 100 ml. of this solution and 0.02 mole (2.9 g.) of 1-phenylpyrazole was heated at 60°C. with stirring for 1 hour and cooled. The yellow solid that precipitated was separated by filtration, washed with water and with methanol, and dried. The yield was 5.8 g.

Anal. Calcd. for $(C_9H_7ClN_2Pd)_2$:
C, 37.9 ; H, 2.46; Cl, 12.45; N, 9.83; Pd, 37.3

Found: C, 41.15; H, 2.49; Cl, 13.5; N, 10.3; Pd, 28.1.
C, 41.52; H, 2.84; N, 10.5 ;

The analytical results indicate contamination of the dimer by bis(1-phenylpyrazole)palladium dichloride, i.e., an incomplete reaction. The contamination can be eliminated by running the reaction longer than 1 hour.

Alternatively, the contaminant can be removed by extraction with hot chloroform, followed by recrystallization of the desired product. For example, 24 g. of crude dimer was stirred with 300 ml. of refluxing chloroform, and the hot mixture was filtered. The solid that did not dissolve in the chloroform was extracted again with chloroform as above and then recrystallized from chlorobenzene. Analysis showed that pure dimer was thus obtained.
Anal. Found: C, 37.8; H, 2.40; N, 9.75; Pd, 37.03.

The dimer can be further characterized by reacting it with a phosphine such as triphenylphosphine and analyzing the resulting derivative.

EXAMPLE C 2-(2-Pyridyl)phenylpalladium(II) Chloride Dimer

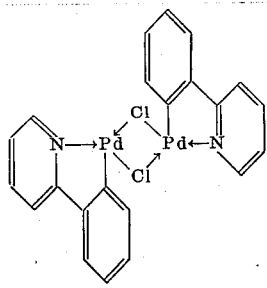

The procedure of Example A was essentially repeated, with 1.7 g. of 2-phenylpyridine in place of the 3,5-dimethyl-1-phenylpyrazole. The yield of dimer was 3.1 g. For characterization, the dimer was converted to its tris(p-tolyl) phosphine derivative. A mixture of the dimer, 3.04 g. of tris(p-tolyl)phosphine, and 50 ml. of dimethylformamide was warmed with stirring until the solids dissolved. This occurred rapidly at about 50°C. The solution was cooled and poured into 400 ml. of water. The solid that precipitated was purified by chromatography on alumina (both the solvent and the eluent were methylene chloride), followed by recrystallization from toluene. The phosphine complex gradually decomposed on heating above about 227°C.
Anal. Calcd. for $(C_{32}H_{29}ClNPPd)_2$:
C, 64.0; H, 4.84; Cl, 5.82; N, 2.33; P, 5.17
Found: C, 63.9; H, 4.18; Cl, 5.74; N, 2.24; P, 5.32. C, 63.8; H, 4.56; N, 2.31

The nmr (nuclear-magnetic-resonance) spectrum was in accord with the structure shown above.

8-(Dimethylamino)-1-naphthylpalladium(II) chloride dimer was prepared by the method of Cope and Friedrich, J. Am. Chem. Soc., 90, 909 (1968).

2-(Dimethylaminomethyl)phenylpalladium(II) chloride dimer was also prepared by the procedure of Cope and Friedrich.

EXAMPLE D 2,2,6,6-Tetramethyl-3,5-heptanedionato-2-(2-pyridyl)phenylpalladium(II)

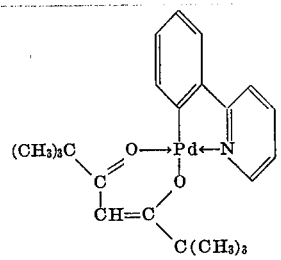

To a stirred mixture of 0.3 g. of 2-(2-pyridyl)-phenylpalladium(II) chloride dimer and 50 ml. of dimethylformamide was added 2.85 g. of an equimolar mixture of 2,2,6,6-trimethyl-3,5-heptanedione and diethylamine. The mixture was stirred at 50°C. for 1 hour, cooled, and poured into 300 ml. of water. The solid that precipitated was separated by filtration, dried, dissolved in methylene chloride, and purified by chromatography on alumina (methylene chloride eluent). The off-white crystals thus obtained were further purified by recrystallization from heptane to give 2.6 g. (59 percent) of 2,2,6,6-tetramethyl-3,5-heptanedionato-2-(2-pyridyl)phenylpalladium(II), m.p. 226°–227°C. with decomposition.

Anal. Calcd. for $C_{22}H_{27}NO_2Pd$: C, 59.6 ; H, 6.09; N, 3.16
Found: C, 59.97; H, 5.98; N, 3.34. The nmr spectrum was in accord with the structure shown above, with a doublet (J = 6) at 1.78τ, a multiplet at 2.1–3.1τ, and singlets at 4.24τ, 8.72τ, and 8.76τ, in the correct 1:7:1:9:9 ratio.

EXAMPLE E 2,2,6,6-Tetramethyl-3,5-heptanedionato-2-(1-pyrazolyl)phenylpalladium(II)

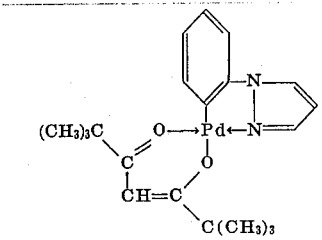

The procedure of Example D was essentially repeated, except that 0.01 mole (2.8 g.) of 2-(1-pyrazolyl)phenylpalladium(II) chloride dimer was used in place of the 2-pyridyl compound. After purification by chromatography, creamy-white crystals of 2,2,6,6-tetramethyl-3,5-heptanedionato-2-(1-pyrazolyl)phenylpalladium(II) melting at 152°–153°C. were obtained. The product was very soluble in benzene and fairly soluble in heptane. It was recrystallized from heptane. The nmr spectrum was in accord with the above structure, with a doublet (J = −2.7) at 2.17τ, a doublet (J = −1.8) at 2.33τ, a multiplet at 2.4–2.5τ, a multiplet at 2.9–3.0τ, a triplet (J = −2.5) at 3.65τ, and singlets at 4.23 τ, 8.72τ, and 8.76τ in the correct 1:1:1:3:1:1:9:9 ratio.

An elemental analysis was run on a separate sample, prepared by essentially the foregoing method on a larger scale and recrystallized from 95 percent ethyl alcohol.

Anal. Calcd. for $C_{20}H_{26}N_2O_2Pd$: C, 55.65; H, 6.03; N, 6.49

Found: C, 55.67; H, 5.88; N, 6.69.

The product of this example was also prepared in 82 percent yield by reaction of 2-(1-pyrazolyl)phenylpalladium(II) chloride dimer with the thallium salt of 2,2,6,6-tetramethyl-3,5-heptanedione in dimethylformamide.

EXAMPLE F 2,2,6,6-Tetramethyl-3,5-heptanedionato-8-(dimethylamino)-1-naphthylpalladium(II)

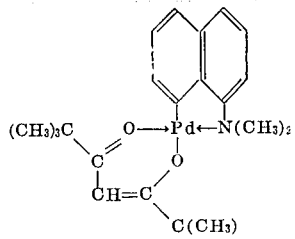

The procedure for Example D was essentially repeated except that 0.01 mole (3.1 g.) of 8-(dimethylamino)-1-naphthylpalladium(II) chloride dimer was used in place of the 2-pyridyl compound. Following purification by chromatography, the product was washed with methanol. There was thus obtained 3.6 g. (79 percent) of crystalline 2,2,6,6-tetramethyl-3,5-heptanedionator-8-(dimethylamino)-1-naphthylpalladium(II) that melted at 206°–207°C. with decomposition.

Prior to analysis the product was recrystallized from a mixture of toluene and heptane.

Anal. Calcd. for $C_{23}H_{31}NO_2Pd$: C, 60.1 ; H, 6.75; N, 3.05

Found: C, 60.63; H, 7.10; N, 3.11 C, 60.79; H, 7.35; N, 3.14. The nmr spectrum was in accord with the above structure, with an aromatic multiplet 2.3–2.9 and singlets at 4.23 τ, 6.67 τ, 8.67τ, and 8.76τ in the correct 6:1:6:9:9 ratio.

EXAMPLE G 2,4-Pentanedionato-2-(1-pyrazolyl)phenylpalladium(II)

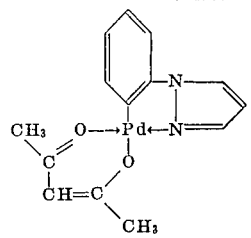

The procedure of Example D was essentially repeated except that an equivalent amount of an equimolar mixture of 2,4-pentanedione and triethylamine was used in place of the 2,2,6,6,-tetramethyl-3,5-heptanedione and diethylamine. The pale-yellow crystalline 2,4-pentanedionato-2-(1-pyrazolyl)phenylpalladium(II) thus obtained decomposed gradually on heating above about 225°C. It was characterized by its infrared absorption spectrum.

EXAMPLE H 2,2,6,6-Tetramethyl-3,5-heptanedionato-2-(dimethylaminomethyl)phenylpalladium(II)

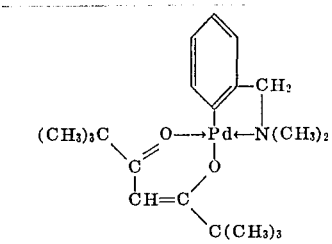

To a solution of 2.7 g. of 2-(dimethylaminomethyl)phenylpalladium(II) chloride dimer in 25 ml. of dimethylformamide was added 3.0 g. of an equimolar mixture of 2,2,6,6-tetramethyl-3,5-heptanedione and diethylamine. The mixture was stirred at 50°C. for 15 minutes and poured into 200 ml. of ice and water. The solid that precipitated was separated by filtration, dried, dissolved in methylene chloride, and purified by chromatography on alumina (methylene chloride eluent). There was thus obtained 2.1 g. (50%) of crystalline 2,2,6,6-tetramethyl-3,5-heptanedionato-(2-dimethylaminomethyl)phenylpalladium(II). The nmr spectrum was in accord with the above structure, with a multiplet at 2.5–3.2τ and singlets at 4.32τ, 6.10τ, 7.18τ, 8.78τ, and 8.85τ in the correct 4:1:2:6:9:9 ratio.

EXAMPLE H 2,2,6,6-Tetramethyl-3,5-heptanedionato-2-(3,5-dimethyl-1-pyrazolyl)phenylpalladium(II)

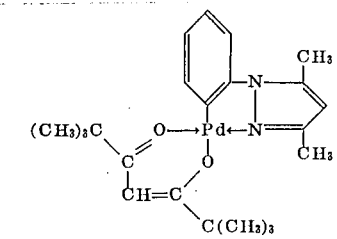

The procedure of Example D was essentially repeated, except that 0.01 mole (3.0 g.) of 2-(3,5-dimethyl-1-pyrazolyl)phenylpalladium(II) chloride dimer was used in place of the 2-pyridyl compound. After purification by chromatography, 2,2,6,6-tetramethyl-3,5-heptanedionato-2-(3,5-dimethyl-1-pyrazolyl)phenylpalladium(II) was obtained in 68 percent yield as a pale-creamy crystalline solid. Recrystallization from heptane gave fine white needles melting at 199°–200°C. The nmr spectrum was in accord with the above structure with multiplets at 2.4τ and 3.03τ and singlets at 4.9τ, 4.26τ, 7.53τ, 8.76τ, and 8.44τ in the correct 1:3:1:1:6:9:9 ratio.

EXAMPLE J 2,4-Pentanedionato-(2-dimethylaminomethyl)phenylpalladium(II)

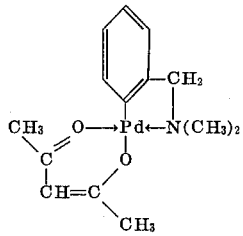

To 400 ml. of 0.19-molar Na₂PdCl₄ in aqueous 95 percent methanol (cf. Example B) was added 22 g. of N,N-dimethylbenzylamine, and the mixture was stirred for 48 hours at room temperature. The yellow solid that precipitated was separated by filtration, washed with water and with methanol, and air-dried. The solid was stirred with 200 ml. of dimethylformamide, and 17 g. of an equimolar mixture of 2,4-pentanediene and trimethylamine was added. This mixture was stirred at 50°C. for 20 minutes and poured into 400 ml. of water. The solid that precipitated was separated by filtration and purified by chromatography (methylene chloride solvent and eluent). There was thus obtained 19 g. (74 percent) of 2,4-pentanedionato-(2-dimethylaminomethyl)phenylpalladium(II) as a crystalline solid. After recrystallization from heptane the product melted at 139°–140°C.

Anal. Calcd. for $C_{14}H_{19}NO_2Pd$: C, 49.65; H, 5.61; N, 4.13

Found: C, 49.4; H, 5.81; N, 4.07 C, 49.2; H, 5.95; N, 4.09.

The nmr spectrum was in accord with the above structure with a multiplet at 2.5–3.2τ and singlets at 4.65τ, 6.08τ, 7.18τ, 7.96τ, and 8.03τ in the correct 4:1:2:6:3:3 ratio.

Scope of the "Aryl-amino" Portion of the Molecule

In addition to the products of Examples H and J, other 2-(dialkylaminomethyl)phenylpalladium(II) chelates are included among products of the invention corresponding to formula I. Thus, other dialkylbenzylamines corresponding to the aryl-amino portion of formula I can be converted to the palladium(II) chloride or bromide dimers by methods described in the literature and in Examples A, B, and C, and the dimeric halides can be substituted for the 2-(dimethylaminomethyl)phenylpalladium(II) chloride dimer in Examples H and J to give products of the invention. They can also be reacted with any of the chelate precursors, Ch-H, described above, to give products of the invention. Examples of other operable dialkylbenzylamines are N,N-diisobutylbenzylamine, N-isopropyl-N-methylbenzylamine, 5-isopropyl-N,N,2-trimethylbenzylamine, N,N,4-trimethylbenzylamine, N,N-diethyl-4-isopentyloxybenzylamine, 3,5-dimethoxy-N,N-dimethylbenzylamine, N,N-diethyl-3-methoxybenzylamine, 4-butoxy-N-ethyl-N-methylbenzylamine, N,N-diethyl-2-fluorobenzylamine, 4-bromo-N,N-dimethylbenzylamine, 5-chloro-N, N-dimethylbenzylamine, 2-bromo-4-methoxy-N,N-dimethylbenzylamine, 3-chloro-N,N,2-trimethylbenzylamine, and 5-methoxy-N,N,2-trimethylbenzylamine. Preferably, because of availability of intermediates, m is 0 or 1 in formula I. Most preferably, m is 0.

Similarly, other N,N-dialkyl-1-naphthylamines can be converted to the corresponding palladium(II) chloride or bromide dimers, and these can be substituted for the 8-dimethylamino-1-naphthylpalladium(II) chloride dimer in the process of Example f to give products of the invention in which the aryl-amino portion of the molecule corresponds to that of formula II. Examples of other operable N,N-dialkyl-1-naphthylamines are N-ethyl-N-methyl-1-naphthylamine, N,N-dibutyl-1-naphthylamine, 4-bromo-N,N-dimethyl-1-naphthylamine, and 4-chloro-N,N-dimethyl-1-naphthylamine. Preferably p is 0 in formula II.

In the same manner, other 1-phenypyrazole derivatives can be converted to the corresponding palladium(II) chloride or bromide dimers. These can be substituted for the 2-(1-pyrazolyl)phenylpalladium(II) chloride dimer of Examples E and G and for the corresponding 3,5-dimethyl derivative of Example I to give products of the invention in which the aryl-amino portion corresponds to that of formula III. Such 1-phenylpyrazole derivatives include 4-bromo-1-phenylpyrazole, 4-chloro-1-phenylpyrazole, 4-pentyl-1-phenylpyrazole, 1,3,5-triphenylpyrazole, 1,4,5-triphenypyrazole, 5-chloro-3-methyl-1-phenylpyrazole, 4-bromo-3-methyl-1,5-diphenylpyrazole, 3-methyl-1,5-diphenylpyrazole, 1-(p-chlorophenyl)pyrazole, 1-(o-tolyl)-pyrazole, 1-(p-bromophenyl)-3-methylpyrazole, 1-(p-chlorophenyl)-3-methyl-5-phenylpyrazole, and 4-bromo-1-(p-tolyl)-pyrazole. Preferably, because of availability of intermediates, p is 0 in formula III, X'' is lower alkyl, and n is at most 2.

Similarly, other 2-phenylpyridine derivatives can be converted to the corresponding palladium(II) chloride or bromide dimers, and these can be substituted for 2-(2-pyridyl)phenylpalladium(II) chloride in the process of Example D to give additional products of the invention in which the aryl-amino portion of the molecule corresponds to that of formula IV. Examples of such 2-phenylpyridine derivatives are 5-methyl-2-phenylpyridine, 3-ethyl-2-phenylpyridine, 3-methoxy-2-phenylpyridine, 2,4-diphenylpyridine, 3,4-dimethyl-2-phenylpyridine, 2-(m-tolyl)pyridine, 2-(o-methoxyphenyl)pyridine, 2-(p-bromophenyl)pyridine, 2-(p-chlorophenyl)pyridine, and 2-(p-chlorophenyl)-4,6-diphenylpyridine. Preferably p is 0 in formula IV, X''' is lower alkyl, and m is 0 or 1. Most preferably m is 0.

In addition, palladium(II) compounds of the general types represented by formulas I–IV and containing aryl-amino portions other than those specifically included in these formulas can be made and have the same beneficial combination of properties discussed above. The compounds include those in which the aryl-amino portion is derived from alkyl- and aryl-imino derivatives of aryl aldehydes, aryl alkyl ketones, and diaryl ketones, e.g., $C_6H_5CH=NCH_3$, $C_6H_5CH=NC_6H_5$, $C_6H_5C(CH_3)=NCH_3$, $(C_6H_5)_2C=NCH_3$, $C_6H_5C(CH_3)=NC_6H^5$, and $(C_6H_5)_2C=NC_6H_5$, together with other such imines with other lower alkyl groups in place of methyl and higher aryl or substituted aryl groups in place of phenyl. They also include those in which the aryl-amino portion is derived from 2-phenylquinoline, 1-phenyl-1,2,3-triazole, 1-phenyl-1,2,4-triazole, and substituted derivatives of each.

Scope of the "Chelate" Portion of the Molecule

Beta-diketones, beta-keto aldehydes, beta-keto esters, mono- and bis(hydrocarbylimino) derivatives of these three classes, tropolones, aminotroponeimines and salicylaldimines are known compounds. The compounds of these structural types that can form monovalent, bidentate chelate derivatives with metal ions by removal of one hydrogen per ligand, by processes discussed earlier, are well known to those skilled in the art. In general, for the types other than the tropolones, aminotroponeimines, and salicylaldimines, any compound in which the carbon between the two carbonyl carbons is bonded to at least one hydrogen and in which at most one of the carbonyl carbons is part of a ring will form chelates in this manner. The chelate portions of the molecules of the products of this invention can be derived from any such compounds. "Carbonyl carbon" as herein used means either of the carbon atoms bonded to carbonyl oxygen (=O or a hydrocarbylimino group (=NR').

The preparation of beta-diketones and beta-keto aldehydes is described by Hauser et al. in Chapter 3 of "Organic Reactions", Vol. VIII, edited by Adams et al. Similarly, the preparation of beta-keto esters is described by Hauser and Hudson in Chapter 9 or Vol. I of "Organic Reactions" (Wiley, 1942). Beta-keto imines and their chelate-forming properties are discussed by Martin et al., J. Am. Chem. Soc., 83, 73 (1962), and in "Inorganic Syntheses", Vol. XI, Ed. Jolly, pages 72 ff. (McGraw-Hill, 1968). Bis-(hydrocarbylimino) derivatives of beta-diketones and their conversion to metal chelates are described by Parks and Holm, Inorg. Chem., 7, 1408 (1968).

Operable beta-dicarbonyl compounds and hydrocarbylimino derivatives thereof, Ch-H, that can be used to form the chelate portion of the molecule include those of the formula

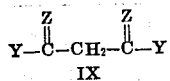

IX

Examples are 5-methyl-2,4-hexanedione, 7-methyl-2,4-nonapedione, 2,4-hexadecanedione, 1-(2-thienyl)-1,3-pentanedione, 1-phenyl-1,3-butanedione, 1-(p-tolyl)-1,3-butanedione, 1,3-bis(2,4,6-trimethylphenyl)-1,3-propanedione, 1-(4-bromophenyl)-1,3-butanedione, 1-(m-anisyl)-1,3-butanedione, 1-(2,5-diethoxyphenyl)-1,3-pentanedione, 1-(2-hydroxyphenyl)-1,3-butanedione, 1-(5-chloro-2-hydroxy)phenyl-1,3-butanedione, 1-(5-chloro-2-hydroxy-4-methylphenyl)-1,3-butanedione, 1,5-diphenyl-2,4-pentanedione, 1-phenyl-j2,4-pentanedione, 1-(1- and 2-naphthyl)-1,3-butanedione, 1-(1-hydroxy-2-naphthyl)-1,3-butanedione, 1,1,1,-trifluoro-2,4-pentanedione, 1,1,1,5,5,5-hexafluoro-2,4-pentanedione, 3,5-heptanedione, 8-methyl-3,5-nonanedione, 4,6-nonanedion, 4-methyl-1-phenyl-1,3-pentanedione, 1-(2-tetrahydrofuryl)-1,3-butanedione, 1-cyclohexyl-1,3-butanedione, 1-(1,2,2,3-tetramethylcyclopentyl)-3-phenyl-1,3-propanedione, 1-phenyl-3-(2-thienyl)-1,3-propanedione, 1-(2-naphthyl)-3-phenyl-1,3-propanedione, 1-(3-methyl-5-oxazolyl)-1,3-butanedione, 1,3-bis(2-pyridyl)-1,3-propanedione, 1-(4-quinolyl)-1,3-butanedione, 1-phenyl-3-(3-pyridyl)-1,3-propanedione, 1-(6-methoxy-4-quinolyl)- 1,3-butanedione, 3-oxobutanal, 5-methyl-3-oxohexanal, 4,4-dimethyl-3-oxopentanal, 3-oxo-4-phenylbutanal, 3-oxo-3-(p-anisyl)propanal, 3-(5-chloro-2-hydroxyphenyl)-3-oxopropanal, 3-(1-naphthyl)-3-oxopropanal, ethyl 3-oxobutanoate, t-butyl 3-oxobutanoate, phenyl ethyl 3-oxobutanoate, benzyl 3-oxobutanoate, ethyl 3-oxohexanoate, ethyl 3-cyclohexyl-3-oxopropanoate, methyl 3-oxo-3-phenylpropanoate, ethyl 3-(2-furyl)-3-oxopropanoate, ethyl 3-oxopentanoate, ethyl 3-(p-anisyl)-3-oxopropanoate, isobutyl 3-oxobutanoate, 4-phenylimino-2-pentanone, 4-(o-anisylimino)-2-pentanone, 4-(p-tolylimino)-2-pentanone, 4-(2,6-dimethylphenylimino)-2-pentanone, 4-(p-chlorophenylimino)-2-pentanone, 1-phenyl-3-phenylimino-1-butanone, 1,3-diphenyl-3-phenylimino-1-propanone, 4-phenylimino-2-butanone, 4-methylimino-2-pentanone ("enol" or "eneamine" form, 4-methylamino-3-penten-2-one), ethyl 3-phenyliminobutanoate, ethyl 3tolylimino) butanoate, 2-phenylamino- 4-phenylimino-2-pentene, 2-(m-tolylamino)-4-(m-tolylimino)-2-pentene, 2-(p-biphenylylamino)-4-(p-biphenylylimino)-2-pentene, and 1-phenylamino-3-phenyliminopropene. The last four compounds are named as the "enol" or "eneamine" isomers. The corresponding "keto" or "aneimine" isomer for, e.g., the first compound is 2,4-bis(phenylimino)pentane (cf. formula IX). Regardless of which isomer predominates in this or any other type of ligand precursor Ch-H, the same metal chelate will be obtained.

The more readily available compounds of formula IX are those in which Y is alkyl of at most 12 carbons; cycloalkyl of five or six ring carbons, lower fluoroalkyl; aryl of at most 10 carbons and containing up to two substituents selected from halo, lower alkyl, lower alkoxy, and hydroxyl; heterocyclyl of five to six nuclear atoms containing up to one such substituent; hydrogen, lower alkoxy, aryloxy of up to 10 carbons, and aralkoxy of up to 10 carbons, at most one Y being hydrogen, alkoxy, aryloxy, or aralkoxy. Products of the invention in which the chelate portion contains such Y groups are therefore preferred. More preferably, Y is hydrogen, lower alkyl, cyclopentyl, cyclohexyl, trifluoromethyl, phenyl, naphthyl, thienyl, hydrogen, lower alkyoxy, phenoxy, or benzyloxy. Most preferably the chelate portion of the molecule is derived from a beta-diketone and Y is lower alkyl.

The more readily available hydrocarbylimino derivatives of beta-diketones, beta-keto aldehydes, and beta-keto esters, i.e., compounds of formula IX in which one Z is NR', are those in which R' is phenyl, optionally substituted with up to two inert substituents which can be lower alkyl, lower alkoxy, or halo, particularly chloro. These values of R' are therefore preferred in products of the invention of this type. Most preferably R', when present, is phenyl. In addition, of the three types of beta-dicarbony compounds, beta-diketones form hydrocarbylimino derivatives most readily, and therefore when one Z is NR' in formula IX, the Y groups are preferably other than hydrogen, alkoxy, aryloxy, and aralkoxy.

Tropolones are described, for example, by Nozoc in Chapter VII of "Non-Benzenoid Aromatic Compounds", edited by Ginsburg (Academic Press, 1959) Formation of metal chelates by tropolones is discussed here and also by Bryant et al., J. Am. Chem. Soc., 75, 3784 (1953). Tropolones that are operable to produce chelating ligands, Ch, in the products of the present invention by loss of a hydrogen include tropolone itself and tropolones containing up to two or three inert substituents such as chloro, bromo, lower alkyl, and phenyl. Examples are tropolone, 4-isopropyltropolone, 3-bromotropolone, 3,5,7-tribromotropolone, 3-bromo-7-methyltropolone, 5-methyltropolone, 5-chlorotropolone, and 5-phenyltropolone. Preferably the number of substituents is zero or one.

Aminotroponeimines and the formation of metal chelates from them are described in Brasen and Howard, U.S. Pat. No. 3,052,705. Any of the aminotroponeimines described in this patent can be used to provide a chelate ligand, Ch, for a product of present invention by loss of a hydrogen. They are usually named as derivatives of 1,3,5-cycloheptatriene and are compounds of the formula

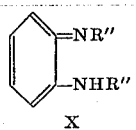

X wherein R'' is hydrogen, alkyl, cycloalkyl, aralkyl, phenyl, or substituted phenyl. The preferred intermediates for use in preparing products of the present invention are compounds of formula X in which R'' is hydrogen, lower alkyl, phenyl, chlorophenyl, lower alkoxyphenyl, and lower alkylphenyl. Examples are 1-amino-7-imino-1,3,5-cycloheptatriene, 1-butylamino-7-butylimino-1,3,5-cycloheptatriene, 1-phenylamino-7-phenylimino-1,3,5-cycloheptatriene, 1-(p-chlorophenylamino)-7-(p-chlorophenylimino)-1,3,5-cycloheptatriene, 1-(o-anisylaimino)-7-(o-anisylimino)-1,3,5-cycloheptatriene, and 1-(m-tolylamino)-7-(m-tolylimino)-1,3,5-cycloheptatriene.

Salicylaldimines are described, for example, by Harris and Livingstone in "Chelating Agents and Metal Chelates", Ed. Dwyer and Mellor, pages 119—120 (Academic Press, 1964), with references to original literature articles. Such compounds include those of the formula

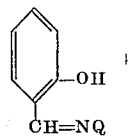

where Q is H, OH, alkyl, or aryl (preferably phenyl) optionally substituted with up to two inert substituents which can be halo, lower alkyl, or lower alkoxy. Examples are salicylaldimine, N-hydroxysalicylaldimine, N-methylsalicylaldimine, N-phenylsalicylaldimine and N-p-tolylsalicylaldimine. The palladium compounds have a relatively high palladium content, are stable at room temperature and usually up to at least 100°C., are readily soluble in common organic solvent systems, and decompose readily under firing conditions to give bright metallic palladium films. In the broad scope of this invention, the amount of palladium used in the decorating composition is not critical. However, in the preferred embodiments, from 0.1 -20 percent, by weight, of palladium metal should be present in the decorating composition. It is pointed out that the amount of palladium metal present in a decorating composition is the important feature rather than the amount of palladium compound since the percent of palladium varies with each palladium compound.

The precious metal decorating compositions of this invention may be prepared by any of the conventional techniques. For example, the palladium derivatives and a flux, with or without a liquid vehicle system, may be simply admixed. In addition, these components and other desirable additives may be dissolved to form a solution and then heated to 120°–130°C. until a gel forms. The decorating compositions may also be rolled in a mill to produce a smooth paste and applied to a glass or ceramic surface.

After application of a film by conventional techniques, the precious metal decorating compositions are fired by heating in a kiln or oven, preferably in an oxidizing atmosphere, at least during the early stages of firing. It will usually be desirable to heat to the point of incipient softening of the material on which the film has been applied, which may vary from about 500°C. for a soft glass to about 800°C. for a porcelain, and even higher for very refractory materials such as Pyroceram or quartz to improve the adherence of the metallic film. Although precious metal decorating compositions are principally used on glass, including soda lime and borosilicate glasses which may be clear, opaque or colored, and ceramics, such as earthenware and porcelain, they may also be applied to other refractory materials including metals, such as stainless steel and aluminum, carbon, mica, porcelain enameled steel or aluminum and the like.

The particular solvent or mixture of solvents used for precious metal decorating compositions is a matter of choice depending upon the method of application used, for example, whether the palladium decorating composition is to be applied by a stamping operation, by a painting operation, by a printing operation, or by means of a squeegee through a screen stencil. The different solvents used will impart to the composition differences in interfacial tension, surface tension, evaporation rate, viscosity, etc. As a consequence, different solvents and mixtures of solvents which impart specific application characteristics to the gold decorating compositions may be used for any particular purpose. Furthermore, different solvents and mixtures of solvents are recommended for different methods of application. Typical solvents usable in this invention, alone or as mixtures, include: methyl ethyl ketone, cyclohexanone, ethyl acetate, amyl acetate, Cellosolve, butanol, nitrobenzene, toluene, xylene, petroleum ether, chloroform, carbon tetrachloride, various terpenes, such as pinene, dipentene, dipentene oxide, and the like, essential oils, such as oils of lavender, rosemary, aniseed, sassafras, wintergreen, fennel and turpentine, various rosins and balsams, and synthetic resins.

An example of a very suitable solvent system is set forth below:

|  | Parts |
|---|---|
| Ortho nitrotoluene | 30 |
| Cineol | 25 |
| Monochlorobenzene | 20 |
| Synthetic camphor | 15 |
| Spike lavender oil | 10 |
| Total | 100 |

The particular flux used in any decorating composition is also largely a matter of choice and depends somewhat upon the type of ceramic material to be decorated therewith. A flux is generally used for the purpose of promoting firm adherence of the fired metallic film to the substrate, and also to promote brilliance of the metallic film. A number of fluxing materials which enhance adherence and brilliance are well known in the art for conventional palladium compositions. For example, salts and resinates of bismuth, cadmium, lead, copper, cobalt, antimony, uranium, iridium, rhodium, vanadium, chromium, and tin may be used for this purpose. Any of the fluxes heretofore used in the art to promote proper appearance and adherence, many of which are commercially available, may be used with the decorating compositions of this invention to likewise promote appearance and adherence. Generally, it is most desirable that the flux be soluble in the solvent system. A number of fluxes are usually needed in combination with each other to produce most satisfactory results in the ultimate fired precious metal films.

It is sometimes desirable to add viscosifying agents such as pine rosin or a reaction product of pine rosin and sulfur to the composition. Particularly gratifying results have been obtained by the use of a viscosifying agent which is obtained by heating the following components to 160°–170°C. to form a reaction product:

Viscosifying Agent A

|  | Parts |
|---|---|
| Pine rosin | 90 |
| Flowers of sulfur | 10 |
| Total | 100 |

The following examples illustrate certain preferred precious metal decorating compositions. In these examples and elsewhere in the specification, all parts, ratios and percentages of materials or components are by weight.

Examples 1–11

Precious metal decorating compositions were prepared by mixing the components listed in Table I in their respective proportions. The compositions were brushed onto china plates and fired from room temperature to a peak temperature of 740°–750°C.

Examples 12–14

Precious metal decorating compositions are similarly prepared using the palladium chelate compounds of Table III. Such compositions are brushed onto china plates and fired from room temperature to a peak temperature of 740°–750°C. to give metallic palladium films.

TABLE I.—USES OF NEW PALLADIUM COMPOUNDS IN LIQUID-BRIGHT FORMULATIONS

| Materials/results | Example number | | | | | | | | | | |
|---|---|---|---|---|---|---|---|---|---|---|---|
|  | 1 | 2 | 3 | 4 | 5 | 6 | 7 | 8 | 9 | 10 | 11 |
| Gold resinate (45.8% Au) | 18.4 | 20.82 | 0.00 | 13.90 | 6.94 | 20.82 | 20.82 | 16.27 | 20.82 | 20.82 | 21.74 |
| Palladium compound*** | 5.5 | 5.48 | 26.30 | 12.43 | 19.37 | 5.48 | 5.48 | 4.28 | 4.38 | 4.77 | 5.64 |
| Terposol** | 24.0 | 21.59 | 21.50 | 21.50 | 21.51 | 21.49 | 21.49 | 16.79 | 21.59 | 21.59 | 17.55 |
| Viscosifying agent A | 10.0 | 10.00 | 10.00 | 10.00 | 10.00 | 0.00 | 5.00 | 7.81 | 10.00 | 10.00 | 10.45 |
| Chlorobenzene | 9.4 | 9.35 | 9.45 | 9.40 | 9.42 | 9.35 | 9.35 | 7.30 | 9.35 | 9.35 | 9.82 |
| Terposol $3* | 19.4 | 19.56 | 26.35 | 21.76 | 24.07 | 30.06 | 24.81 | 37.15 | 20.56 | 20.17 | 20.90 |
| Red dye | 0.5 | 0.50 | 0.00 | 0.33 | 0.17 | 0.00 | 0.25 | 0.59 | 0.50 | 0.50 | 0.52 |
| Vanadium resinate | 1.0 | 1.00 | 0.50 | 0.84 | 0.66 | 1.00 | 1.00 | 0.78 | 1.00 | 1.00 | 1.04 |
| Chromium resinate | 0.8 | 0.80 | 0.40 | 0.66 | 0.54 | 0.80 | 0.80 | 0.63 | 0.80 | 0.80 | 0.84 |
| Bismuth resinate | 4.0 | 4.00 | 2.00 | 3.34 | 2.66 | 4.00 | 4.00 | 3.13 | 4.00 | 4.00 | 4.18 |
| Rhodium resinate | 7.0 | 7.00 | 3.50 | 5.84 | 4.66 | 7.00 | 7.00 | 5.47 | 7.00 | 7.00 | 7.31 |
| Results | A | A | C | D | B | A | A | A | A | A | A |

*A mixture of alpha and beta pinene.
**A solvent system comprising 13% chlorobenzene, 13% xylene and 74% terposol #3.
***The palladium compounds utilized are described in Table II.

RESULTS: A=Bright, specular, silvery film formed. B=Bright, specular film formed with blue-gray tinge. C=Dull film formed with coppery tinge. D=Dull film formed with blue-gray tinge.

TABLE II

PALLADIUM COMPOUNDS USED (Examples 1 – 11)

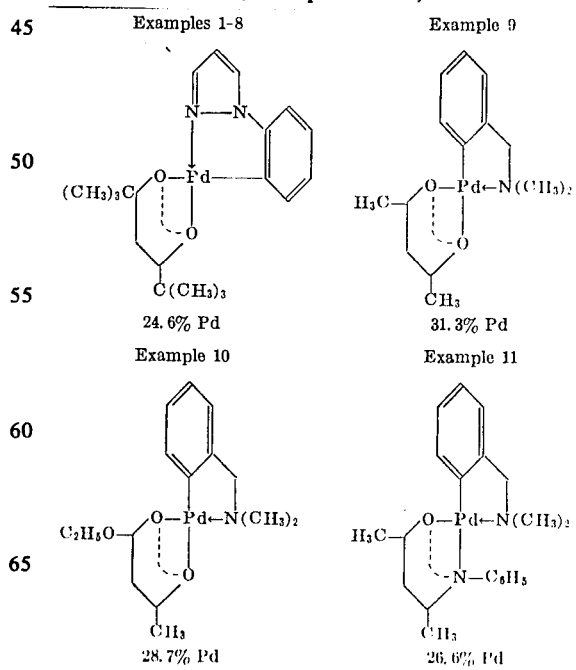

Examples 1-8 — 24.6% Pd
Example 9 — 31.3% Pd
Example 10 — 28.7% Pd
Example 11 — 26.6% Pd

TABLE III

PALLADIUM COMPOUNDS (Examples 12 — 14)

Example 12

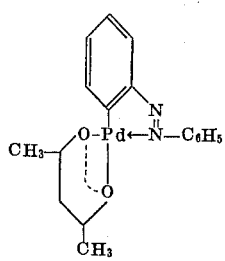

Example 13

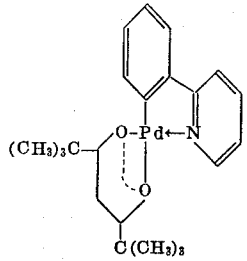

Example 14

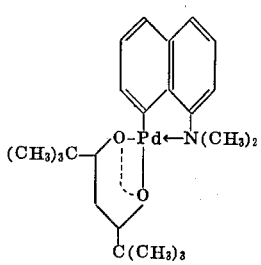

Since it is obvious that many changes and modifications can be made in the above-described details without departing from the nature and spirit of the invention, it is to be understood that the invention is not to be limited to said details except as set forth in the appended claims.

We claim:

1. In a precious metal decorating composition comprising a flux, an organic solvent system, and a palladium compound, the improvement comprising a palladium compound represented by one of the following formulas:

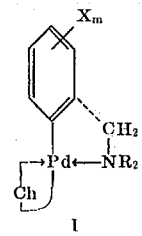

I

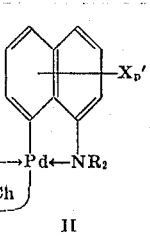

II

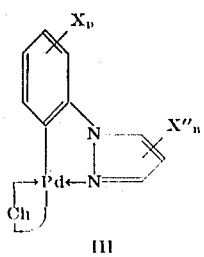

III

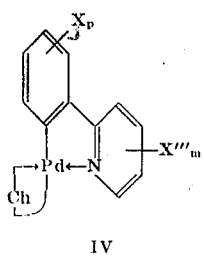

IV

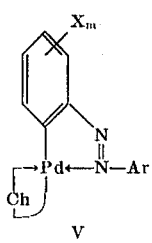

V wherein:
Pd represents palladium in the +2 oxidation state;
R is lower alkyl, where at least one R group is bonded to nitrogen through a carbon which is bonded to at least two hydrogens;
Ar is aryl having up to 12 carbon atoms;
X is from the group consisting of lower alkyl, lower alkoxy, F, Cl, and Br;
$m$ is from the group consisting of 0, 1, and 2;
X' is from the group consisting of Cl and Br;
$p$ is from the group consisting of 0 and 1;
X'' is from the group consisting of Cl, Br, lower alkyl, and phenyl;
$n$ is from the group consisting of 0, 1, 2, and 3;
X''' is from the group consisting of lower alkyl, lower alkoxy, and phenyl;
lower alkyl and lower alkoxy each having up to eight carbon atoms; and
Ch is a bidentate chelate ligand formed by removal of a hydrogen from a compound selected from the group consisting of a beta-diketone, a beta-keto aldehyde, a beta-keto ester, a mono(hydrocarbylimino) derivative of a beta-diketone, a mono(hydrocarbylimino) derivative of a beta-keto aldehyde, a bis(hydrocarbylimino) derivative of beta-diketone, a bis(hydrocarbylimino) derivative of beta-keto ester, a tropolone, an aminotroponeimine, and a salicylaldimine, Ch having up to 12 carbon atoms.

2. A precious metal decorating composition in accordance with claim 1 wherein the amount of palladium metal present in said composition is within the range of 0.1–20 weight percent.

3. A precious metal decorating composition in accordance with claim 1 where the palladium compound is 2,2,6,6-Tetramethyl-3,5-heptanedionato-2-(2-pyridyl)phenylpalladium(II).

4. A precious metal decorating composition in accordance with claim 1 where the palladium compound is 2,2,6,6-Tetramethyl-3,5-heptanedionato-2-(1-pyrazolyl)phenylpalladium(II).

5. A precious metal decorating composition in accordance with claim 1 where the palladium compound is 2,2,6,6-Tetramethyl-3,5-heptanedionato-8-(dimethylamino)-1-naphthylpalladium(II).

6. A precious metal decorating composition in accordance with claim 1 where the palladium compound is 2,4-Pentanedionato-(2-dimethylaminomethyl)phenylpalladium(II)

7. A precious metal decorating composition in accordance with claim 1 where the palladium compound is (Ethyl 3-oxobutanoato)-2-(dimethylaminomethyl)phenylpalladium(II).

8. A precious metal decorating composition in accordance with claim 1 where the palladium compound is (4-Phenylimino-2-pentanonato)-2-(dimethylaminoethyl)-phenylpalladium(II).

9. In a precious metal decorating composition comprising a flux, an organic solvent system and a palladium compound, the improvement comprising a palladium compound represented by one of the following formulas:

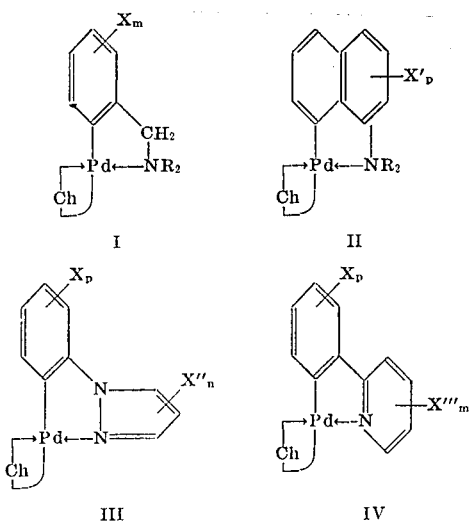

wherein:
Pd represents palladium in the +2 oxidation state;
R is lower alkyl, where at least one R group is bonded to nitrogen through a carbon which is bonded to at least two hydrogens;
X is from the group consisting of lower alkyl, lower alkoxy, F, Cl, and Br;
$m$ is from the group consisting of 0, 1, and 2;
X' is from the group consisting of Cl and Br'
$p$ is from the group consisting of 0 and 1;
X" is from the group consisting of Cl, Br, lower alkyl, and phenyl;
$n$ is from the group consisting of 0, 1, 2, and 3;
X''' is from the group consisting of lower alkyl, lower alkoxy, and phenyl;
lower alkyl and lower alkoxy each having up to eight carbon atoms; and
Ch is a bidentate chelate ligand formed by removal of a hydrogen from a compound selected from the group consisting of a beta-diketone, a beta-keto aldehyde, a beta-keto ester, a mono(hydrocarbylimino) derivative of a beta-diketone, a mono (hydrocarbylimino) derivative of a beta-keto ester, a bis (hydrocarbylimino) derivative of beta-keto aldehyde, a bis (hydrocarbylimino) derivative of beta-keto ester, a tropolone, an aminotroponeimine, and a salicylaldimine, Ch having up to 12 carbon atoms.

10. A precious metal decorating composition according to claim 9 comprising a flux, an organic solvent system and a palladium compound represented by one of the following formulas:

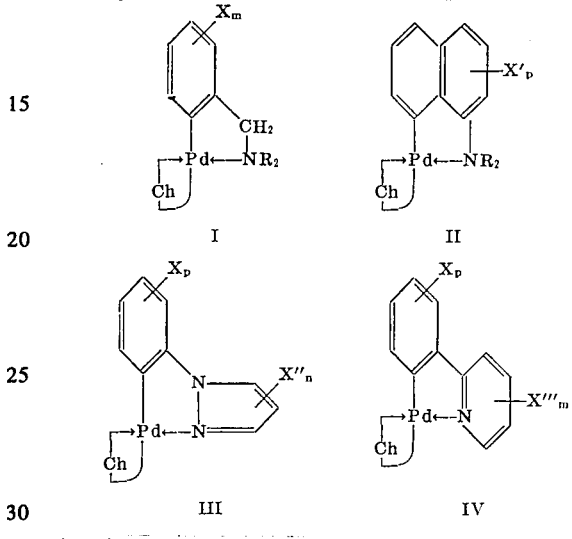

wherein:
Pd represents palladium in the +2 oxidation state;
R is lower alkyl, where at least one R group is bonded to nitrogen through a carbon which is bonded to at least two hydrogens;
X" is from the group consisting of Cl, Br, lower alkyl and phenyl;
$n$ is from the group consisting of 0, 1 and 2;
lower alkyl having up to eight carbon atoms; and
Ch is a bidentate chelate ligand formed by removal of a hydrogen from a compound selected from the group consisting of a beta-diketone, a beta-keto ester, and a mono(hydrocarbylimino) derivative of a beta-diketone, Ch having up to 12 carbon atoms.

* * * * *